US006862377B2

(12) United States Patent
Szafraniec et al.

(10) Patent No.: US 6,862,377 B2
(45) Date of Patent: Mar. 1, 2005

(54) SYSTEM AND METHOD FOR PMD MEASUREMENT FROM COHERENT SPECTRAL ANALYSIS

(75) Inventors: Bogdan Szafraniec, Sunnyvale, CA (US); Douglas M. Baney, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 116 days.

(21) Appl. No.: 10/271,132

(22) Filed: Oct. 15, 2002

(65) Prior Publication Data

US 2004/0071381 A1 Apr. 15, 2004

(51) Int. Cl.[7] .................................................. G02B 6/00
(52) U.S. Cl. ........................................................ 385/11
(58) Field of Search ........................................... 385/11

(56) References Cited

U.S. PATENT DOCUMENTS

| 6,362,874 B1 | * | 3/2002 | Madsen ...................... 356/73.1 |
| 6,563,590 B2 | * | 5/2003 | Chowdhury et al. ........ 356/484 |
| 2003/0108267 A1 | * | 6/2003 | Bandemer et al. ............. 385/11 |

OTHER PUBLICATIONS

Heismann, Fred et al., "Automatic Compensation of First-Order Polarization Mode Dispersion in a 10Gb/s Transmission System", ECEC 98, Sep. 20–24, 1998, Madrid, Spain, pp. 529–530.

Sunnerud, Henrik et al., "A Comparison Between Different PMD Compensation Techniques", Journal of Lightwave Technology, vol. 20, No. 3, Mar. 2002, pp. 368–378.

Poti, Luca et al., "Experimental Demonstration of a PMD Compensator with a Step Control Algorithm", IEEE Photonics Technology Letters, vol. 13, No. 12, Dec. 2001, pp. 1367–1369.

Song, Shuxian et al., "A Poincare Sphere Method for Measuring Polarization–Mode Dispersion Using Four–Wave Mixing (FWM) in Single–Model Optical Fiber", pp. 79–82.

Calvani, Riccardo et al., "Real–Time Heterodyne Fiber Polarimetry with Narrow–and Broad–Band Sources", Journal of Lightwave Technology, vol. LT–4, No. 7, Jul. 1986, pp. 877–883.

* cited by examiner

Primary Examiner—Daniel Stcyr
Assistant Examiner—April Taylor
(74) Attorney, Agent, or Firm—Juergen Krause-Polstorff

(57) ABSTRACT

Methods and systems allow an in situ determination of the magnitude of PMD in an optical network and provide an estimate of the PMD impairment in the transmitted signal even when PMD is time dependent.

21 Claims, 6 Drawing Sheets

SYSTEM AND METHOD FOR PMD MEASUREMENT FROM COHERENT SPECTRAL ANALYSIS

CROSS-REFERENCE TO RELATED APPLICATIONS

This application relates to the co-pending application Ser. No. 10/271048, filed on the same day, entitled "Method and Apparatus for a Jones Vector Based Heterodyne Optical Polarimeter" by Szafraniec owned by the assignee of this application and incorporated herein by reference.

BACKGROUND OF INVENTION

Evaluation of transmission quality is an important aspect of fiber optic communications systems. Prior art evaluation of transmission quality is performed by electronic detection where the detected sequence of digital information is compared using a functional relationship to the actual value transmitted along with the information such as parity checks or error correction coding. However, the detection of errors does not provide an indication of the origin or cause of the transmission error. Many factors can produce transmission factors including limited received power, chromatic dispersion effects, poor optical signal-to-noise ratio, polarization mode dispersion (PMD) and nonlinear effects. The issue of PMD is of particular interest as it is expected that PMD will become the major source of error for optical networks transmitting information at data rates greater than 20 Gbits/s. Hence, it is important to measure PMD and determine the impact of PMD or PMD impairment on individual dense wavelength-division multiplexing (DWDM) channels. It is important to distinguish between PMD and PMD impairment. The PMD describes the birefringence of the optical link while the PMD impairment describes the effect of that birefringence on a DWDM channel or frequency band. Even large PMD may not cause PMD impairment if all optical frequencies comprising a frequency band propagate throughout the link in predominantly the same polarization state.

PMD refers to the temporal pulse distortion that arises from different propagation speeds for light of differing polarization states through an optical medium such as a single mode optical fiber. PMD arises from the birefringence in an optical fiber that increases with fiber length. The larger the birefringence, the larger the PMD and the more rapidly the polarization state changes with wavelength and with fiber length. Hence, a typical method of determining PMD involves analyzing the evolution of the polarization state with wavelength. The PMD induced delay is defined as:

$$\tau = \frac{\Delta\theta}{2\pi\Delta v} \quad (1)$$

where $\Delta\theta$ is the rotation angle on a Poincare sphere and $\Delta v$ is the optical frequency span that produced $\Delta\theta$. To determine PMD in an operational network requires that the polarization state analysis be performed over the width of a single channel or frequency band of the DWDM system carrying data. Thus, spectral width is related to the frequency band spacing. The present International Telecommunications Union (ITU) grid is placed at 100 GHz or 0.8 nm with further reduction of frequency band spacing being planned. This requires that the polarization state measurements are performed with high spectral selectivity.

Westbrook et al., in "Wavelength sensitive polarimeter for multichannel polarization and PMD monitoring," OFC 2002, pp. 257–259, have disclosed a wavelength selective polarimeter that is based on fiber grating technology. The disadvantage of this approach is that the current grating technology is limited to a resolution of about 0.01 nm. Roudas et al., in "Coherent heterodyne frequency-selective polarimeter for error signal generation in higher-order PMD compensators," OFC 2002, pp. 299–301, disclosed a heterodyne polarimeter based on Stokes vector measurements that requires sequential switching of the local oscillator (LO) polarization state. The heterodyne polarimeter potentially offers high resolution but the technique disclosed by Roudas et al. resembles that of classical intensity based polarimeters and does not take advantage of the phase information provided by the heterodyne signal. Therefore, sequential switching of the polarization state is required. This may lead to erroneous measurements in systems where the polarization state is time dependent.

SUMMARY OF THE INVENTION

Methods and systems in accordance with the invention provide an in situ determination of the magnitude of PMD in an optical network and provide an estimate of the PMD impairment in the transmitted signal even when PMD is time dependent. Estimates of PMD impairment aid in determining the quality of the data transmitted in the individual DWDM channels or frequency bands while also providing a feedback signal to PMD compensators used to minimize PMD effects. These methods are typically based on the polarization state evolution within a single DWDM frequency band or in an ensemble of frequency bands of a DWDM system. For the purposes of this application, the term "frequency band" is used to denote an arbitrary fraction (proper or improper fraction) of a DWDM channel.

DETAILED DESCRIPTION OF THE INVENTION

In accordance with the invention, a highly selective heterodyne polarimeter is typically used that employs direct phase measurement of the heterodyne beat term to estimate the polarization state. The heterodyne polarimeter used may be a phase sensitive optical heterodyne detector as described in detail in "Method and Apparatus for a Jones Vector Based Heterodyne Optical Polarimeter" referenced above and incorporated by reference. Alternatively, a heterodyne polarimeter as described by, for example, Roudas et al, in "Coherent heterodyne frequency-selective polarimeter for error signal generation in higher-order PMD compensators", OFC 2002, WQ2, may also be used to determine the Stokes vector with sufficient frequency selectivity in accordance with the invention but requires sequential switching of the polarization state.

Figure 1:
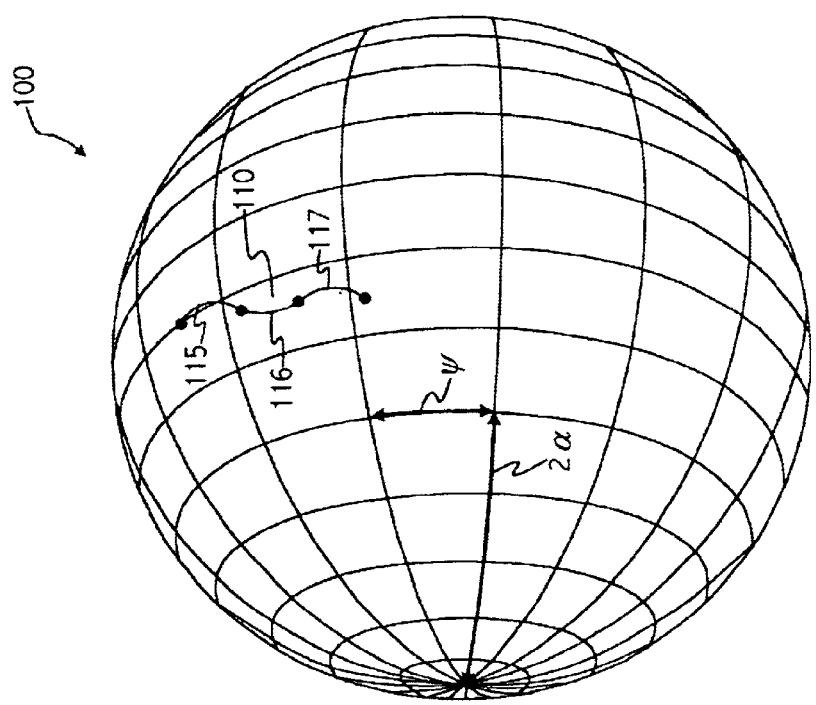
FIG. 1 shows a Poincare sphere with a coordinate system in accordance with the invention.

Two parameters, α and ψ which describe the polarization state and are shown in FIG. 1 on Poincare sphere 100 are typically determined by the Jones vector based heterodyne polarimeter. The polarization state is described by a Jones vector:

$$V = \begin{pmatrix} \cos\alpha \\ e^{i\psi}\sin\alpha \end{pmatrix} \quad (2)$$

The description of the polarization state may be rewritten in terms of a normalized Stokes vector P using the same parameters, α and ψ from the Jones vector based heterodyne optical polarimeter:

$$P = \begin{pmatrix} \cos 2\alpha \\ \sin 2\alpha \cos\psi \\ \sin 2\alpha \sin\psi \end{pmatrix} \quad (3)$$

Normalized Stokes vector P may be viewed as a position vector capable of locating any point on a unit radius Poincare sphere. Note that the fourth parameter of the Stokes vector that describes the degree of polarization is omitted. Eq. (3) defines the polarization state shown in FIG. 1 in Cartesian coordinates x, y, and z and is useful for describing a parameter which corresponds to the length of an arc on the unit Poincare sphere such as Poincare sphere 100 in FIG. 1. Note that the normalized Stokes vector may also be obtained, for example, from a heterodyne polarimeter as described in Roudas et al.

Over a comparatively narrow frequency range, as for example, the frequency band related to the ITU grid of 100 GHz, the polarization state can be viewed as tracing an arc on Poincare sphere 100 that has an axis of rotation defined by the principal states of polarization. This behavior of the polarization start is characteristic for wavelength independent PMD known also as first order PMD. As the PMD increases, the path traced on Poincare sphere 100 may become more complex because the axis of rotation as defined by the principle states of polarization becomes wavelength dependent and moves about Poincare sphere 100. It is typically a good assumption to take the axis of rotation as nearly stationary over a single ITU grid of 100 GHz as is done here although it is possible to deal with a more complex evolution of the polarization state. This requires subdividing path 110 traced on Poincare sphere 100 into shorter arcs 115, 116, and 117 that each have a nearly stationary axis of rotation defined by the principle states of polarization. In practice, this may be achieved by determining the principle states of polarization from consecutive polarization measurements in accordance with Eq. (6).

The angle of rotation Δθ provides a measure of PMD and the corresponding PMD induced delay is determined in accordance with the invention from Eq. (1). As noted above, Δv in Eq. (1) denotes the range of optical frequencies over which the measurement of the polarization state is performed. In accordance with the invention, it is possible to work with small optical signals because heterodyning offers high dynamic range. Small optical signals typically occur on the tails of the typical optical spectrum describing, for example, non-return to zero or return to zero modulation. Hence, Δ may be measured well below (20 to 40 dB) the peak of the spectrum.

Figure 2:
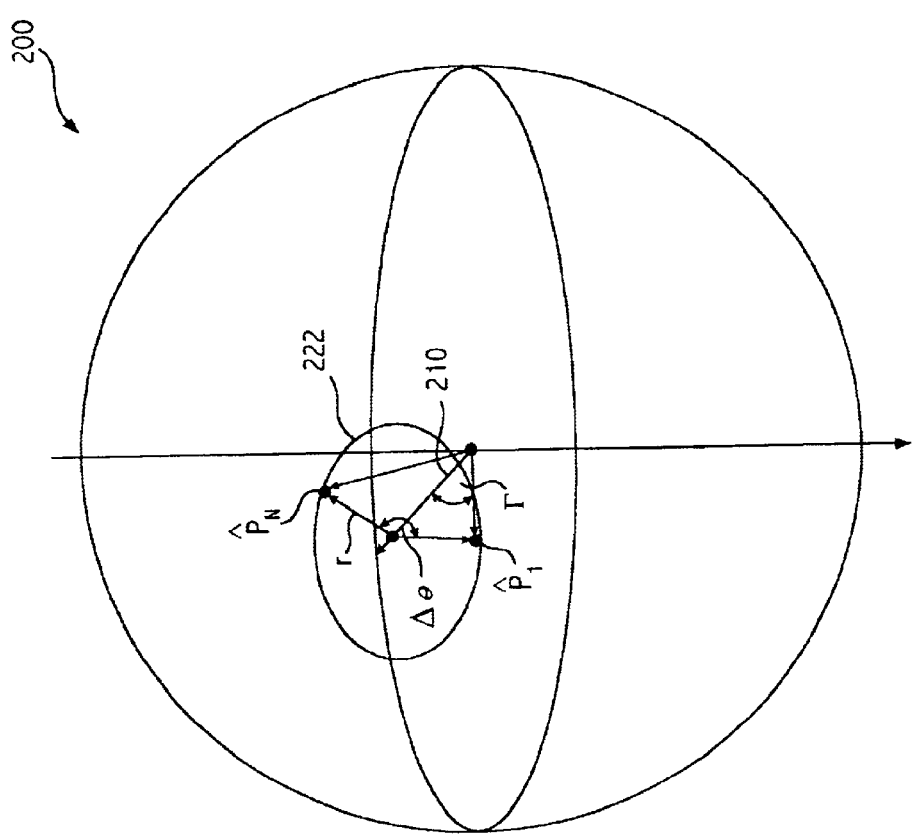
FIG. 2 shows a polarization state tracing a length of arc on a Poincare sphere in accordance with the invention.

With reference to FIG. 2, the length of arc 222 depends on the position of the polarization state with respect to axis of rotation 210 which is the birefringence axis. The length of arc 222 provides a measure of the PMD impairment. PMD impairment is the polarization dispersion observed in a particular optical channel having some polarization state. The length of arc 222 may be used as a feedback signal that controls a PMD compensator (see FIG. 5) to provide for birefringence compensation by adjusting the relative optical path length of the fast and slow polarization states.

The length of arc 222 is not typically the distance between the endpoints $P_1$ and $P_N$. The distance between $P_1$ and $P_N$ is given by the fractional length of the great circle that lies between them. Arc 222 is taken to contain the points $P_1$, $P_2 \ldots, P_N$ where each point $P_i=(x_i, y_i, z_i)$ is described in Cartesian coordinates according to Eq. (3). The angles α and ψ are typically output from the Jones vector based heterodyne optical polarimeter referenced above.

The length of arc 222 is typically approximated by summing the distances between the individual points $P_1$, $P_2 \ldots, P_N$ forming arc 222. Because the radius of Poincare sphere 100 is unity, a suitable selection criteria for choosing the points $P_1, P_2 \ldots, P_N$ is that the distance between the points be a small fraction of 1, for example in the range of 0.01 to 0.1. The distance from point $P_i$ to point $P_{i+1}$, where $(x_i, y_i, z_i)$ and $(x_{i+1}, y_{i+1}, z_{i+1})$ are the respective Cartesian coordinates, is approximated using the distance formula:

$$d_i = \sqrt{(x_i - x_{i+1})^2 + (y_i - y_{i+1})^2 + (z_i - z_{i+1})^2} \quad (4)$$

The approximate length of arc 222, L, which is a measure of the PMD impairment, is then given by:

$$L \approx \sum_i d_i \quad (5)$$

To determine the rotation angle Δθ that subtends arc 222 it is necessary to find the axis of rotation determined by the principle polarization states. The vector axis of rotation or the axis of birefringence is orthogonal to the plane defined by any three distinct points that make up arc 222, for example, points $P_1$, $P_{N/2}$, $P_N$ which can be viewed as unit vectors from the origin to the respective coordinates on the surface of Poincare sphere 200. Hence, the vector axis of rotation lying along the principle polarization state can be determined from the cross product:

$$\vec{X} = (\hat{P}_{N/2} - \hat{P}_1) \times (\hat{P}_N - \hat{P}_{N/2}) \quad (6)$$

which after normalization becomes (note the hat indicates a unit vector):

$$\hat{X} = \frac{\vec{X}}{|\vec{X}|} \quad (7)$$

The angle Γ, as shown in FIG. 2 can be typically found from the cross product of $\hat{X}$ with $\hat{P}_i$ for polarization states represented by points $P_1 \ldots P_N$ that form arc 222 on Poincare sphere 200 with principle polarization state $\hat{X}$. Note the angle Γ is fixed for any point on arc 222. This allows determination of the radius r corresponding to polarization evolution arc 222:

$$r = \sin \Gamma = |\hat{X} \times \hat{P}_i| \quad (8)$$

The rotation angle Δθ subtends arc 222 and may be found explicitly by constructing two vectors of length r that extend from $\hat{X}$ to points $P_1$ and $P_N$, respectively, and that lie in the plane of arc 222. The two required vectors are given by $\hat{P}_n - (\hat{P}_i \cdot \hat{X})\hat{X}$ and $\hat{P}_1 - (\hat{P}_i \cdot \hat{X})\hat{X}$. The normalized dot product of the two vectors yields $\cos \Delta\theta$ where $\Delta\theta$ is the angle between the two vectors by construction. The rotation angle $\Delta\theta$ is then given by:

$$\Delta\theta = \cos^{-1}\left[\frac{\cos\Delta\Psi - \cos^2\Gamma}{\sin^2\Gamma}\right] \approx \frac{L}{r} \tag{9}$$

where $\cos\Delta\psi = \hat{P}_1 \cdot \hat{P}_N$, $\cos\Gamma = \hat{P}_i \cdot \hat{X}$ and $\sin\Gamma$ is given by Eq. (8) with PMD then being determined by Eq. (1).

Another parameter other than the length of the arc that may be used as a feedback signal to a PMD compensator is the degree of polarization (DOP) as described by N. Kikuchi, "Analysis of signal degree of polarization degradation used to control signal for optical polarization mode dispersion compensation," in Journal of Lightwave Technology, Vol. 19, No. 4, 2001, pp.480–486. The DOP of an optical signal reflects the degree of waveform degradation caused by PMD and therefore the amount of DOP decrease corresponds to the amount of signal pulse distortion caused by PMD.

If a specific channel is affected more by the PMD, the degree of polarization of the channel is less than that of a channel whose optical frequencies are predominately in a single polarization state which necessitates that DOP≈1. The DOP is closely related to the optical spectrum and the distribution of polarization states over that frequency band. Both the optical spectrum and distribution of polarization states over the spectrum are measured by the phase sensitive heterodyne polarimeter that uses a swept local oscillator and is described in "Method and Apparatus for a Jones Vector based Heterodyne Optical Polarimeter" and is incorporated by reference. The optical spectrum is described by power spectral density function $\rho(v)$ while the distribution of polarization states may, for example, be represented on Poincare sphere 200. The DOP may be defined by the centroid of arc 222 on the surface of Poincare sphere 200 and is equal to the distance of the centroid from the center of Poincare sphere 200. If the centroid lies at the center of Poincare sphere 200 then arc 222 is a great circle and the DOP is zero. Similarly, if all frequencies in a spectrum of a single channel have the same polarization state, then, the centroid lies on the surface of Poincare sphere 200 and the DOP=1.

For clarity, it has been assumed above that the power distribution is uniform. For cases of a non-uniform spectrum the determination of the centroid must include a power spectral density function $\rho(v)$. Arc 222 on Poincare sphere 200 can be parameterized in terms of the frequency $v$ where $v=v_0+\gamma t$. Hence, arc 222 can be described parametrically by functions $x(v)$, $y(v)$, $z(v)$ that form the Stokes vector $S$ of Eq. (3). The functions $x(v)$, $y(v)$, $z(v)$ represent the normalized components of the Stokes vector for the 0° linear, 45° linear and the right circular polarized components. The centroid coordinates $x_0$, $y_0$, $z_0$ may be determined by calculating the individual Cartesian coordinates:

$$x_0 = \frac{\int \rho(v)x(v)dv}{\int \rho(v)dv} \tag{10}$$

$$y_0 = \frac{\int \rho(v)y(v)dv}{\int \rho(v)dv} \tag{11}$$

$$z_0 = \frac{\int \rho(v)z(v)dv}{\int \rho(v)dv} \tag{12}$$

where integration is performed over the spectral width of a DWDM channel. Hence, the DOP is given by:

$$DOP = \sqrt{x_0^2 + y_0^2 + z_0^2} \tag{13}$$

To obtain accurate determinations of PMD it is desirable to have a long arc to obtain reliable estimates of the angle of rotation $\Delta\theta$. One embodiment in accordance with the invention controls the polarization of the signal in a given frequency band to ensure that the length of the arc is not near a minimum. The polarization of the signal in the frequency band is typically sequentially switched between states that are 90° with respect to each other in the reference frame of Poincare sphere 200.

Typically, multiple DWDM frequency bands transmitted through predominately the same optical network have uncorrelated and random polarization states. Because the polarization states are random, the length of the arcs for polarization evolution vary depending on how near the individual polarization states are to the corresponding principle polarization states. Knowing the expected length of the arc for the random polarization states allows determination of the rotation angle $\Delta\theta$.

Figure 3A:
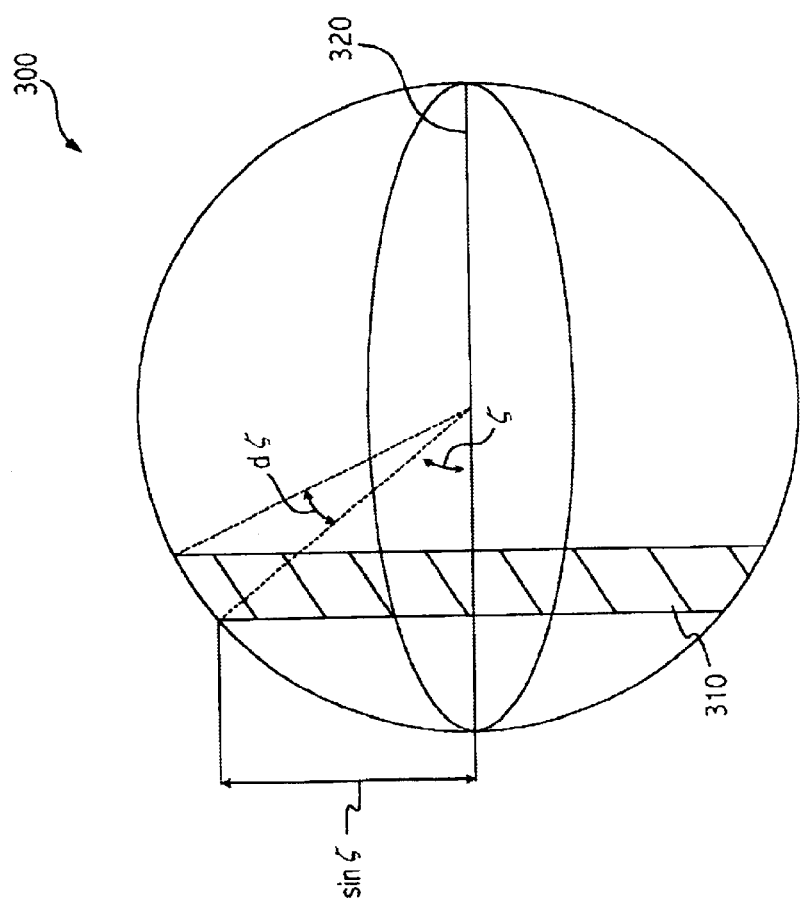
FIG. 3a shows that the probability of a random polarization state $\rho(\zeta)$ having a value $\zeta$ on the Poincare sphere, is equal to sin $\zeta$ within a multiplicative constant in accordance with the invention.

With reference to FIG. 3a, the probability of a random polarization state $\rho(\zeta)$ having a value $\zeta$, is equal to $\sin \zeta$ within a multiplicative constant and is equal to the radius of circle 310 on Poincare sphere 300. Circle 310 is formed by all polarization states having the particular value of which is equal to $2\alpha$ (see Eqs (2) and (3)). If the principle polarization states define axis 320 as shown in FIG. 3a, the probability that a random polarization state is a principle polarization state approaches zero while the most probable polarization has $\zeta=\pi/2$. The length of an arc on Poincare sphere 300 can also be expressed in terms of the angle $\zeta$. The length of an arc $L(\zeta)$ on Poincare sphere 300 is proportional to the radius of circle 310, $\sin \zeta$, and is equal to $\Delta\theta \sin \zeta$ where $\Delta\theta$ is the rotation angle around the axis of birefringence 320.

Given the probability density function $\rho(\zeta)$ and the function for the length of the arc $L(\zeta)$, the expected value of the length of the arc can be determined from:

$$\bar{L} = \frac{\int L(\zeta)\rho(\zeta)d\zeta}{\int \rho(\zeta)d\zeta} \tag{14}$$

where $\bar{L}$ is the mean or expected value for the length of the arc. By substituting for $L(\zeta)$ and $\rho(\zeta)$:

$$\bar{L} = \frac{\Delta\theta \int_0^\pi \sin\zeta \sin\zeta d\zeta}{\int_0^\pi \sin\zeta d\zeta} \tag{15}$$

that yields:

$$\bar{L} = \Delta\theta \frac{\pi}{4}. \quad (16)$$

The mean length of the arc may also be calculated as an average of the length of the individual arcs. The length of an individual arc may determined using the method described above for a single DWDM frequency band. Hence an average length $\bar{L}$ may be determined $$\bar{L} = \frac{1}{M}\sum_{j}^{M} L_j \quad (17)$$

where the average is calculated over M measured DWDM frequency bands. Combining Eqs.(16) and (17) gives for $\Delta\theta$:

$$\Delta\theta = \frac{4}{\pi M}\sum_{j}^{M} L_j. \quad (18)$$

Eq.(18) approximates the rotation angle $\Delta\theta$ from the average length of the arcs and hence estimates PMD from an average PMD impairment. It is assumed that all the lengths $L_i$ are measured for the same spectral width $\Delta v$ as described above. Then the PMD is determined using Eq. (1).

In accordance with an embodiment of the invention, M measurements may be made on a single frequency band instead of measuring M frequency bands if the frequency of measurements is low enough to ensure that the measurements are uncorrelated. This assumes that some birefringence wander is always present in an optical network which results in polarization state wander. Typical sources for birefringence wander are environmental fluctuations such as temperature.

Figure 3B:
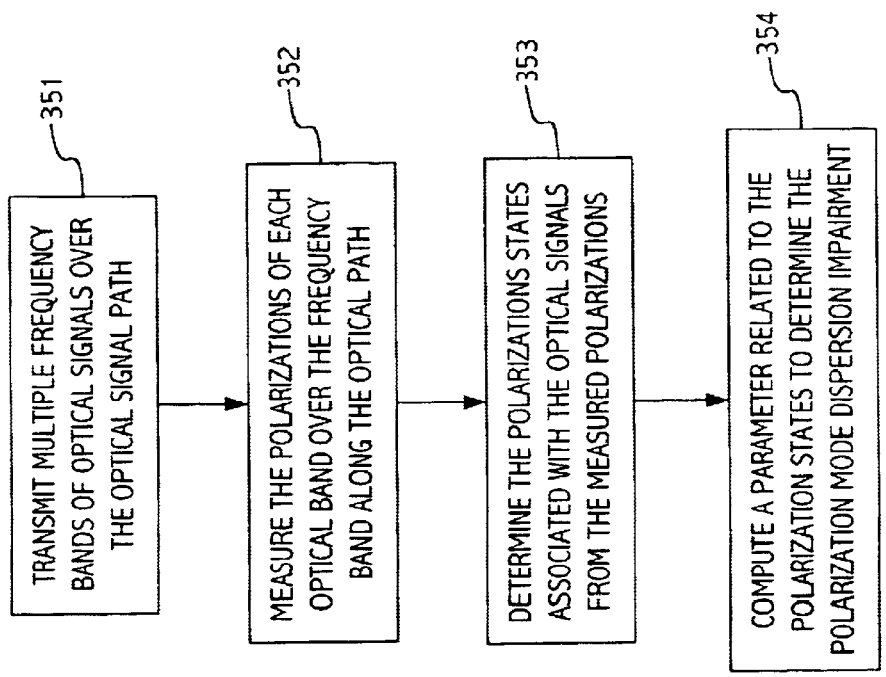
FIG. 3b shows an embodiment in accordance with the invention.

FIG. 3b shows an embodiment in accordance with the invention for determining the PMD and PMD impairments along an optical signal path. Note that PMD impairment typically varies from frequency band to frequency band and typically a different PMD impairment will be associated with each frequency band. In step 351 multiple frequency bands of optical signals are transmitted over the optical fiber. The multiple frequency bands may be generated sequentially using a tunable swept laser or by a number of different laser sources. A single frequency band may be created by intensity modulating a laser directly or typically externally by using an intensity modulator. In step 352 the polarization of each optical band is measured over its spectral width at a receiver location that is sufficiently far from the transmitter that birefringence and hence first order PMD is an important effect. From the measured polarization parameters, such as, for example, $\alpha$ and $\psi$, the associated polarization states are determined in step 353. In step 354, a parameter is computed to determine the PMD impairment along the optical fiber path for each measured frequency band. Then the PMD is calculated, using for example, Eqs. (18) and (1).

Figure 4:
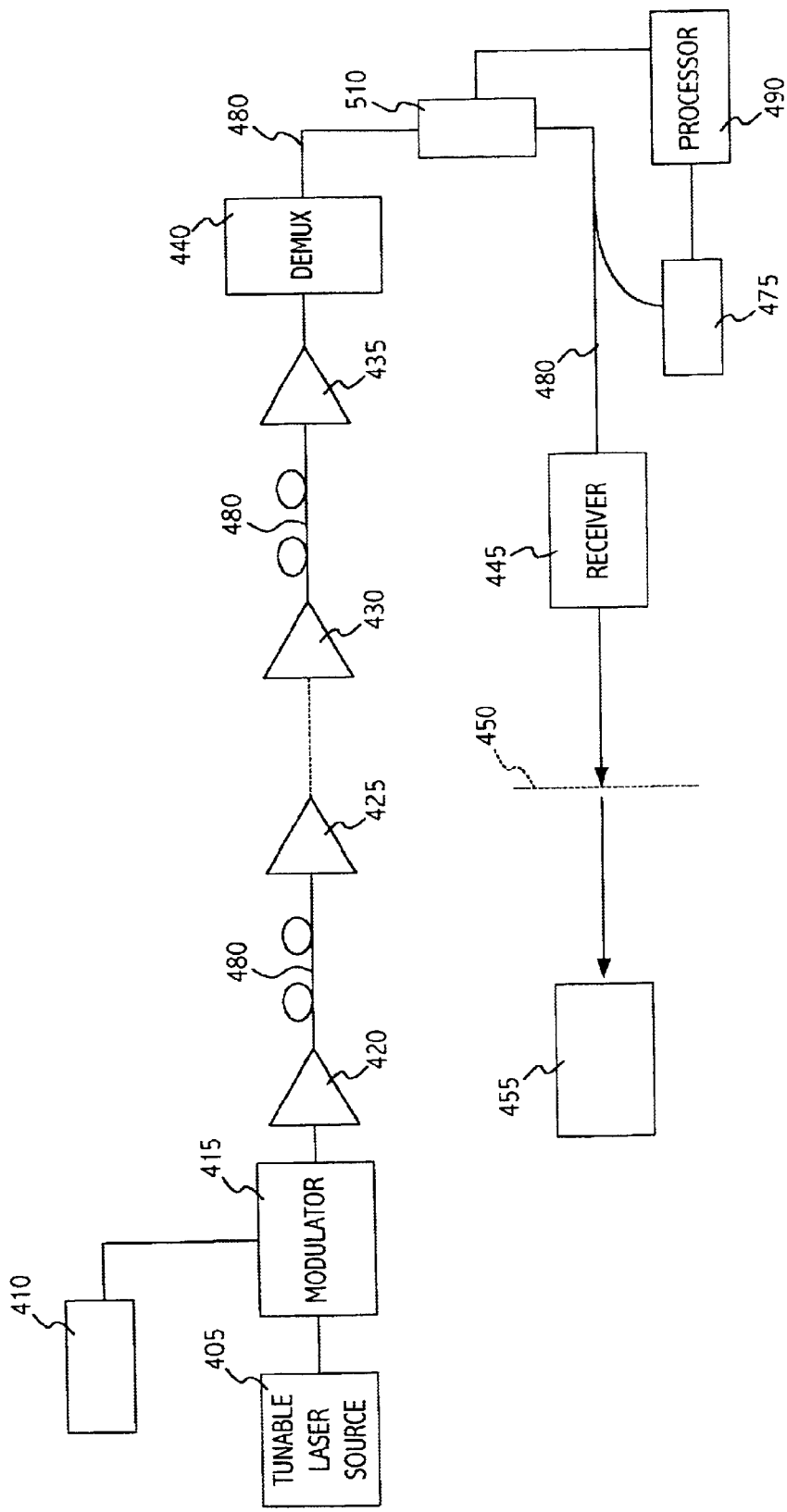
FIG. 4 shows an embodiment in accordance with the invention.

FIG. 4 shows a simplified block diagram for a typical optical digital communication system which is typically affected by PMD in accordance with an embodiment of the invention. Tunable laser source 405 typically operating around 1.55 microns is coupled to modulator 415 which is driven by modulator driver 410. Note that in typical implementations of an optical digital communication system there is typically more than one tunable laser source. The input pulses typically couple into both the slow and fast polarization modes which results in PMD distortion over longer transmission paths. The PMD impairment depends on the polarization state of laser 405. Amplifiers 420, 425, 430 and 435 amplify the signal along optical fiber path 480. Demultiplexer 440 routes the optical signal on a wavelength basis to receiver 445 that is typically one of many, which in turn relays the signal to a 1.3 micron intra-office link from which the signal proceeds to exchange 455. Without correction, the optical signal at receiver 445 typically suffers from PMD due to birefringence associated with the optical fiber path. Optical heterodyne polarimeter 475 is optically coupled to optical path 480 to measure the polarization of signals traveling over optical fiber path 480. Processor 490 is coupled to optical heterodyne polarimeter 475. Processor 490 typically calculates the PMD impairment and PMD induced delay as discussed above. The PMD induced delay information is used to adjust PMD compensator 510 to remove the first order PMD impairment. Alternatively, the PMD impairment information may be used to assist with electronic-based methods for mitigation of the PMD.

Figure 5:
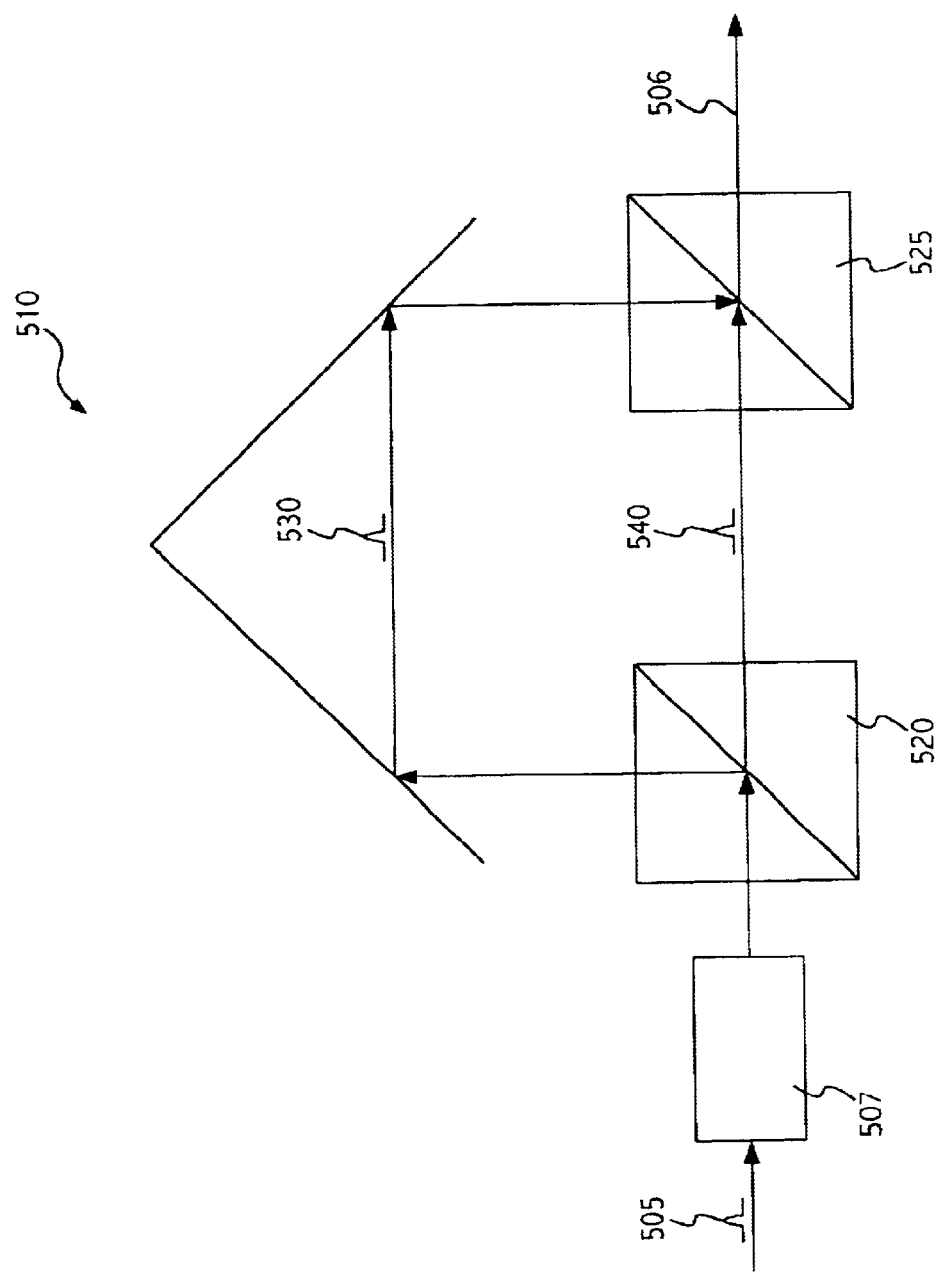
FIG. 5 shows an exemplary single stage PMD compensator.

FIG. 5 shows an exemplary single stage PMD compensator 510. Signal 505 enters polarizing beamsplitter 520 from polarization controller 507. Polarizing beam splitter 520 separates the signal into faster polarized state 530 and slower polarized state 540. The path length for polarized state 530 is adjustable using moveable corner cube mirror 565. Polarized state 530 is recombined with polarized state 540 in beam splitter 525 and the combined signal is launched into fiber 506. Moveable mirror 565 is used to adjust the path length for polarized state 530 so that it is delayed by the PMD induced delay $\tau$ determined in accordance with the invention as described above. Hence, PMD compensator 510 serves to remove the first order PMD impairment due to the birefringence of the optical fiber by delaying faster polarized state 530 with respect to slower polarized state 540 by the PMD induced delay T. Operationally, PMD compensator 510 may theoretically be inserted anywhere between modulator 415 and receiver 445 in the optical digital communication system of FIG. 4 when the communications system is sufficiently linear. Therefore, if the total PMD induced delay is $\tau$, polarized state 530 may be predelayed by $\tau$ at modulator 415 so that both polarized states 530 and 540 are "in phase" at receiver 445. Typically, PMD compensator 510 is inserted before receiver 445.

Alternatively, instead of using polarizing beam splitters and spatially separating optical waves in orthogonal polarization states one can use a birefringent element in the form of a wave plate or a section of polarization maintaining (PM) optical fiber. The use of multi-stage compensators allows for the compensation of first order and second order PMD. The advantages and disadvantages of typical PMD compensation techniques are, for example, described by H. Sunnerud et al in "A Comparison Between Different PMD Compensation Techniques," *Journal of Lightwave Technology*, Vol. 30, No 3, March 2002, pp. 368–378.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

We claim:

1. A method for determining the polarization mode dispersion impairment along an optical signal path comprising:

transmitting a frequency band of optical signals over said optical signal path;

measuring polarizations of said optical signals over said frequency band at a position along said optical path using a phase sensitive heterodyne detector having a swept local oscillator;

determining polarization states associated with said optical signals from said polarizations; and computing a parameter related to said polarization states to determine said polarization mode dispersion impairment.

2. The method of claim 1 wherein said parameter is a length of an arc on a Poincare sphere.

3. The method of claim 2 further comprising determining an angle of rotation from said length of arc.

4. The method of claim 3 further comprising determining the polarization mode dispersion induced delay by dividing said angle of rotation by said frequency band.

5. The method of claim 3 wherein a centroid of said arc determines the degree of polarization of said frequency band.

6. The method of claim 5 wherein a power spectrum density function is used to determine said centroid.

7. The method of claim 1 wherein a probability density function is used to determine an average of said parameter.

8. The method of claim 7 wherein said average is used to determine an angle of rotation.

9. The method of claim 8 further comprising determining a polarization mode dispersion induced delay by dividing said angle by said frequency band.

10. The method of claim 1 wherein said polarizations are measured more than once for said frequency band to determine an average parameter.

11. The method of claim 1 wherein said heterodyne detector is a Jones vector based heterodyne polarimeter.

12. A system for determining a polarization mode dispersion impairment in an optical fiber link comprising:

a laser source optically coupled to said optical fiber link;

a receiver optically coupled to said optical fiber link to receive signal transmitted from said laser source;

a phase sensitive heterodyne polarimeter optically coupled to said optical fiber link to measure the polarizations of said signals; and a processor coupled to said phase sensitive heterodyne polarimeter to calculate said polarization mode dispersion impairment.

13. The system of claim 12 wherein said phase sensitive heterodyne polarimeter is a Jones vector based heterodyne polarimeter.

14. The system of claim 12 wherein said processor further calculates a polarization mode dispersion induced delay for said optical fiber link.

15. The system of claim 14 further comprising a polarization mode dispersion impairment compensator to compensate for said polarization mode dispersion impairment delay.

16. The system of claim 12 wherein said processor calculates said polarization mode dispersion impairment for a frequency band.

17. The system of claim of 16 wherein said processor calculates an average polarization mode dispersion impairment for said optical fiber link.

18. The system of claim 17 wherein said average polarization mode impairment is used to calculate a polarization mode dispersion induced delay.

19. The system of claim 17 wherein said average polarization mode impairment is estimated from lengths of arcs on a Poincare sphere.

20. The system of claim 12 wherein said processor further calculate a degree of polarization for a frequency band.

21. The system of claim 12 wherein said polarization mode dispersion impairment compensator comprises a birefringence element.

* * * * *